(12) United States Patent
Nakajima et al.

(10) Patent No.: US 7,050,383 B2
(45) Date of Patent: May 23, 2006

(54) OPTICAL RECORDING MEDIUM RECORDED WITH INFORMATION IN DEPTH DIRECTION, AND METHOD AND APPARATUS OF REPRODUCTION THEREFROM

(75) Inventors: Junsaku Nakajima, Kashihara (JP); Hitoshi Takeuchi, Kitakatsuragi-gun (JP); Masaru Nomura, Nabari (JP); Kenji Ohta, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 560 days.

(21) Appl. No.: 09/824,554

(22) Filed: Apr. 2, 2001

(65) Prior Publication Data
US 2002/0001274 A1    Jan. 3, 2002

(30) Foreign Application Priority Data
Apr. 4, 2000  (JP)  ............................ 2000-102088

(51) Int. Cl.
*G11B 7/00* (2006.01)
(52) U.S. Cl. .................................. 369/275.3
(58) Field of Classification Search ............. 369/275.3, 369/53.21, 47.27, 275.4, 94
See application file for complete search history.

(56) References Cited

U.S. PATENT DOCUMENTS

| | | | | |
|---|---|---|---|---|
| 5,168,490 A * | 12/1992 | Braat | .................... | 369/109.02 |
| 5,572,507 A | 11/1996 | Ozaki et al. | | |
| 5,696,757 A | 12/1997 | Ozaki et al. | ............. | 369/275.4 |
| 5,896,366 A * | 4/1999 | Ogawa | .................... | 369/275.4 |
| 5,946,288 A * | 8/1999 | Ogawa | .................... | 369/275.4 |
| 6,310,854 B1 * | 10/2001 | Sato et al. | ............... | 369/275.3 |
| 6,363,041 B1 * | 3/2002 | Timmermans et al. | ... | 369/47.15 |
| 6,556,537 B1 * | 4/2003 | Endoh | .................... | 369/275.4 |
| 6,760,299 B1 | 7/2004 | Nakajima et al. | | |

FOREIGN PATENT DOCUMENTS

| | | |
|---|---|---|
| CA | 2085974 | 6/1994 |
| DE | 44 03 171 A1 | 8/1995 |
| EP | 0 542 730 A2 | 5/1993 |
| EP | 0 545 472 A1 | 6/1993 |
| EP | 0 708 439 A1 | 4/1996 |
| EP | 0 905 683 A2 | 3/1999 |
| EP | 1 067 523 A2 | 1/2001 |
| JP | 60-242532 | 12/1985 |

(Continued)

OTHER PUBLICATIONS

U.S. Appl. No. 09/606,282, filed Jun. 29, 2000, Junsaku Nakajima et al.

*Primary Examiner*—Nabil Hindi
(74) *Attorney, Agent, or Firm*—David G. Conlin; David A. Tucker; Edwards Angell Palmer & Dodge LLP

(57) ABSTRACT

An optical disk has a lead-in region provided at the inner circumference side and a user region provided at the outer circumference side. Pit string 3 of pits of different depths is formed in the lead-in region. Light beam reflected from the pit string is detected by detector and TPP and RF signals are output by differential amplifier and addition amplifier. A ternary signal is restored from pits based on the TPP and RF signals. Information is recorded by pits of the same depth in the user region. Recording information in the depth direction in the lead-in region increases the recording capacity thereof. The information recorded in the depth direction in the lead-in region cannot be transferred to a user region of another optical disk.

11 Claims, 13 Drawing Sheets

FOREIGN PATENT DOCUMENTS

| | | |
|---|---|---|
| JP | 03-141032 | 6/1991 |
| JP | 05-205276 | 8/1993 |
| JP | 05-290379 | 11/1993 |
| JP | 06-215380 | 8/1994 |
| JP | 07-272282 | 10/1995 |
| JP | 08-153331 | 6/1996 |
| JP | 10106042 A | 4/1998 |
| JP | 2000-048478 | 2/2000 |
| JP | 2001-076347 | 3/2001 |
| WO | WO 99/13466 | 3/1999 |

* cited by examiner

FIG.5A MARK STRING PIT STRING
FIG.5B CROSS SECTION
FIG.5C RF SIGNAL
FIG.5D TPP SIGNAL

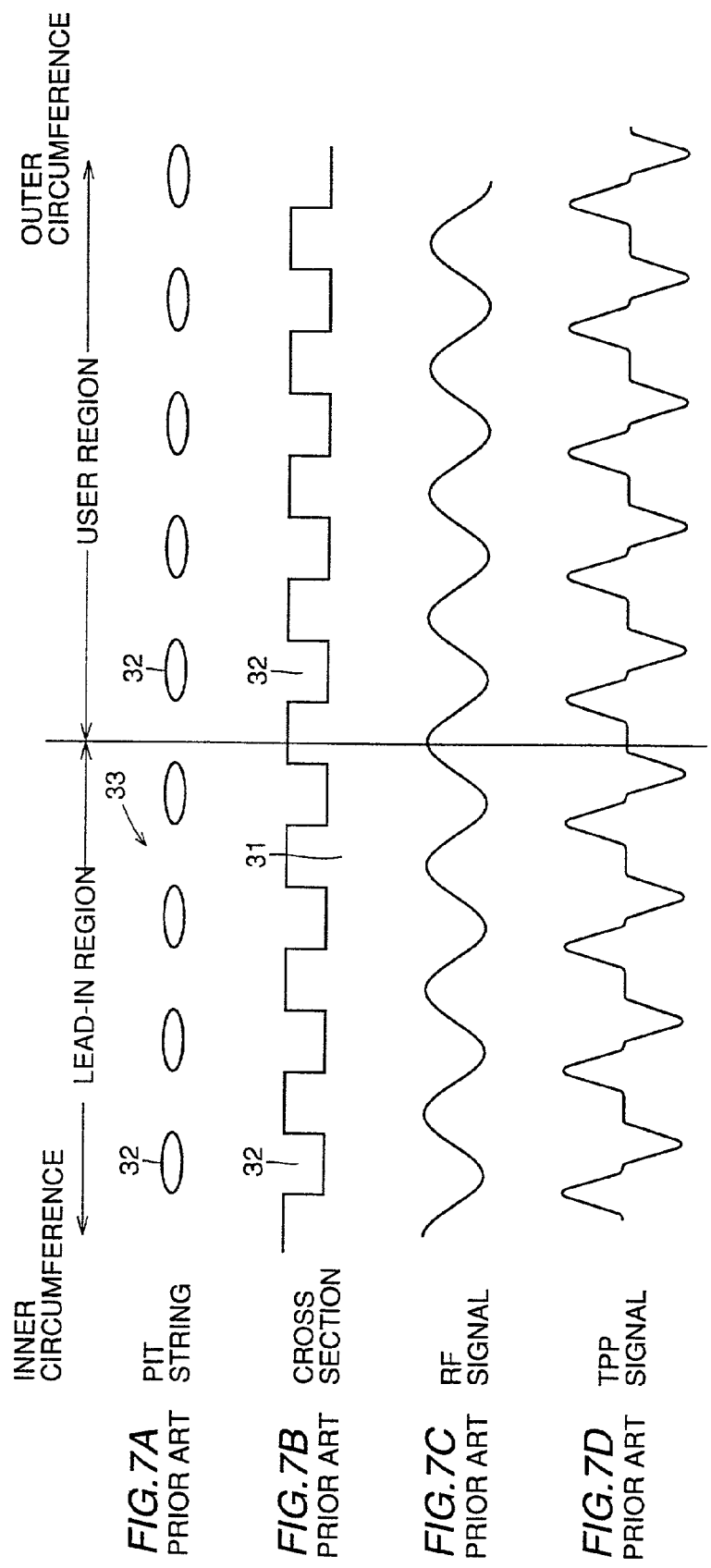

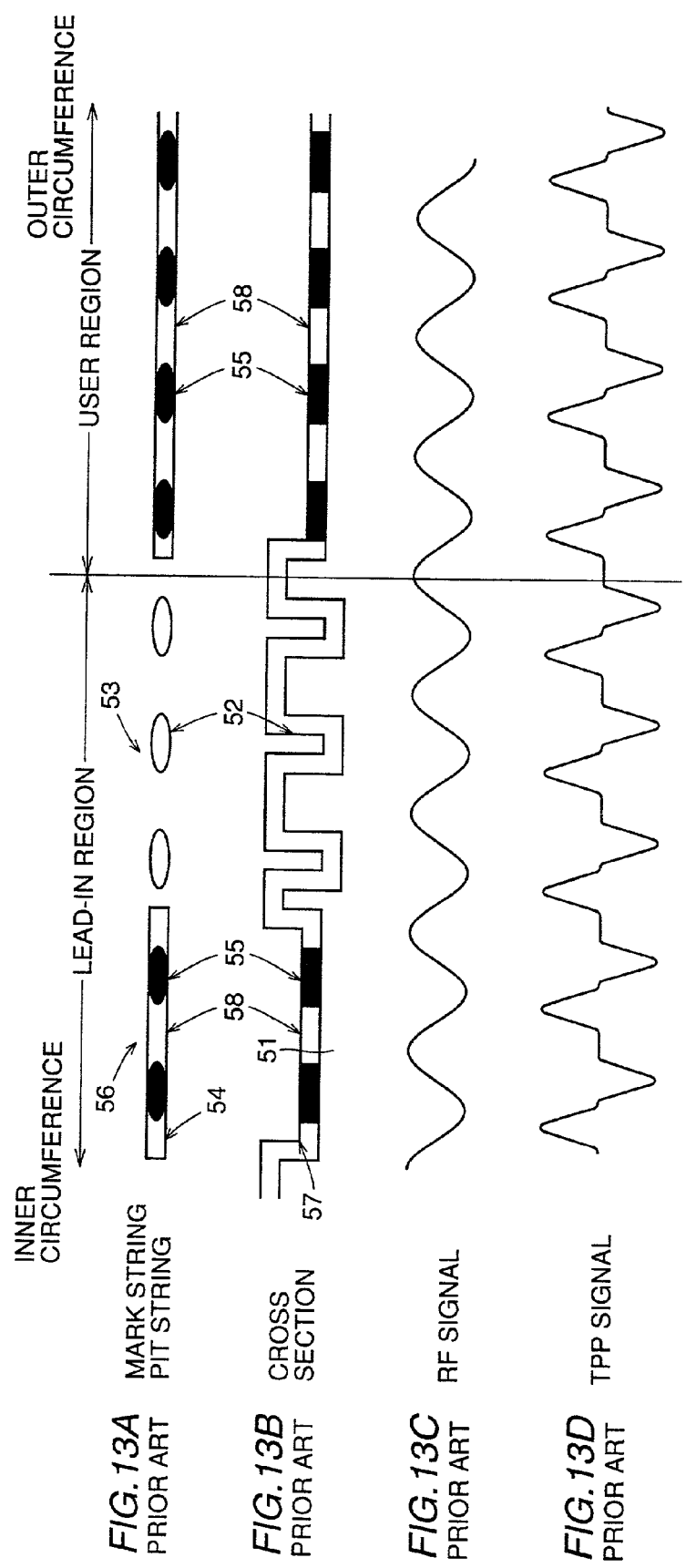

OPTICAL RECORDING MEDIUM RECORDED WITH INFORMATION IN DEPTH DIRECTION, AND METHOD AND APPARATUS OF REPRODUCTION THEREFROM

BACKGROUND OF THE INVENTION

1. Field of the Invention

The present invention relates to an optical recording medium in which information is recorded in the direction of depth of the substrate, and a method and apparatus of reproducing information therefrom. More particularly, the present invention relates to a read only or recordable optical recording medium including a first region in which first information such as additional information is recorded at least in the depth direction of the substrate and a second region in which second information such as main information is recorded or can be recorded in the plane direction of the substrate, and a reproduction method and reproduction apparatus of such an optical recording medium.

2. Description of the Background Art

In a conventional optical recording medium such as an optical disk, binary recording is carried out, wherein information is binarized and recorded corresponding to the presence/absence, the length, the width, or the position in the substrate plane of pits, marks and the like. More specifically, pits are provided on the substrate in a read only optical disk (referred to as ROM disk hereinafter) to have information recorded. In contrast, recording marks are provided at the recording layer on the substrate in a recordable disk such as a phase change disk, magneto-optical disk, and organic dye disk to have information recorded.

Information is transposed to the absence/presence, the length, the width, or the position in the substrate plane of pits, marks or the like to be recorded on an optical disk. In other words, information is recorded in the dimension of the plane direction of the substrate using pits, marks and the like. The string of pits, marks, or the like is arranged concentrically or spirally on a circular substrate to form a track. The light beam for reproduction follows this track to scan the string of pits, marks or the like. Taking advantage of the change in the quantity of reflected light, rotation of the plane of polarization of light and the like based on these pits and marks, recorded information is reproduced.

The pit string, mark string and the like formed concentrically or spirally are generally assigned an address sequentially from the inner circumference towards the outer circumference. A predetermined region at the inner circumference side with the smaller address constitutes the region generally called "lead-in". Information unique to the relevant optical disk is written in this lead-in region. More specifically, various information required for the disk drive, disk player, disk recorder or the like to record information or reproduce information to/from the optical disk is written in the lead-in region.

Information unique to the disk includes, for example, information identifying the disk type (ROM disk, R disk, RW disk, RAM disk, or the like), information specifying the rotation speed and linear velocity of the disk for recording and reproduction, the laser power during recording or the like, the address information of a region on the disk that can be used by the user, key information required to cancel the scramble or encryption, and the like.

The key required to descramble or decrypt is the key used in scrambling or encrypting the contents. The scramble or encryption cannot be canceled without this key. In other words, this release key is indispensable to reproduce the scrambled or encrypted contents.

In accordance with the higher density and higher level of functions of disks, the trend is to increase the amount of information written in the lead-in region.

A conventional optical recording medium and a reproduction method and apparatus of an optical recording medium will be described hereinafter with reference to the drawings.

FIGS. 6–8 show a first example of a conventional optical recording medium. FIG. 6 schematically shows the arrangement of pits formed on a ROM disk as an example of an optical recording medium. A pit string 33 of a plurality of pits 32 are formed spirally on the plane of a substrate 31, whereby information is recorded.

FIG. 7A is a schematic representation of pit string 33 formed spirally in the conventional ROM disk of FIG. 6, illustrated in a linear version from the inner circumference region to the outer circumference region of substrate 31. The lead-in region is provided at the inner circumference side of the disk, and the user region is provided at its outer circumference side.

The ROM disk ID (identification information), the address information of the user region and the like are recorded in the lead-in region. When the information written in the user region is scrambled or encrypted, a scramble key or encryption key thereof is also recorded in this lead-in region.

Main information such as video and audio data is recorded in the user region. When the contents become the subject of copyright protection, the main information will be recorded in a scrambled or encrypted manner.

FIG. 7B is a schematic sectional representation of substrate 31 corresponding to pit string 33 of FIG. 7A. The portion of pit 32 is represented as a hole. Pit 32 is formed with a constant depth.

FIG. 7C shows an RF signal representing the quantity of reflected light obtained by reproducing pit string 33 with a reproduction light beam (not shown). FIG. 7D represents a tangential push-pull signal (TPP signal) obtained by reproducing pit string 33.

The RF signal and TPP signal will be described hereinafter with reference to FIGS. 7C, 7D and FIGS. 8A and 8B. FIG. 8A schematically shows the scanning manner of a beam spot 34 of the light beam for reproduction on pit 32. FIG. 8B schematically shows the manner of reflected light 35 of the reproduction light beam from the disk plane entering photoreceptor elements 36a and 36b forming a detector 37 that is divided into two regions, region A and region B. The RF signal and TPP signal are obtained by the following equations using respective outputs A and B of photoreceptor elements 36a and 36b.

$$RF = A + B$$

$$TPP = A - B$$

An RF signal having a waveform as shown in FIG. 7C is obtained since the quantity of reflected light of the light beam is small at the pit portion and large at the non-pit portion. Also, since the pit is formed with a constant depth, a TPP signal as shown in FIG. 7D that changes with the same polarity will be obtained with respect to all pits, as will be described afterwards.

FIGS. 11A and 11B schematically show a structure of a string of marks in a recordable disk which is a second example of a conventional optical recording medium. FIGS.

11C and 11D represent the waveforms of respective signals obtained by reproducing information from the recordable disk.

FIG. 11A schematically shows a mark string 46 formed of a number of marks 45 written on the plane of a recordable disk, illustrated in a linear version from the inner circumference region to the outer circumference region of a substrate 41. A guide groove of the light beam that is generally referred to as a groove is provided in the recordable disk. The light beam for recording follows this groove 44 or the land which is a region between grooves to write a mark 45. Mark 45 can be written in either or both of the groove and land. FIG. 11A shows an example of marks 45 written in groove 44.

FIG. 11B schematically shows a cross section of the disk, corresponding to mark string 46 of FIG. 11A. It is appreciated from FIG. 11B that the mark portion is provided so that the reflectance of light differs between a mark portion 45 and a non-mark portion 48 in a recording layer 47 provided on substrate 41, and not formed as a hole such as for the pit.

FIG. 11C shows an RF signal representing the quantity of reflected light obtained by reproducing mark string 46 with a reproduction light beam. The quantity of reflected light is smaller in mark portion 45 than in non-mark portion 48.

FIG. 11D represents a TPP signal obtained by reproducing mark string 46. Since mark 45 is formed with a constant depth in groove 44, a TPP signal that changes with the same polarity is obtained from all marks 45.

FIGS. 12 and 13A–13D show a third example of a conventional optical recording medium. FIG. 12 schematically shows a recordable disk that employs a phase change recording layer in an unrecorded status as an example of an optical recording medium. A groove 54 which is a guide groove is formed spirally on the plane of a substrate 51. Information is recorded in the form of marks in groove 54. Pits 52 are formed instead of groove 54 at the inner circumference side of the disk. Information that should not be rewritten is recorded by pits 52.

FIGS. 13A and 13B schematically show the structure of a mark string and pit string of the recordable disk of FIG. 12. FIGS. 13C and 13D represent the waveforms of respective signals obtained by reproducing recorded information from the recordable disk.

FIG. 13A schematically shows a mark string 56 formed of marks 55 recorded on a spiral groove 54 and a pit string 53 formed of pits 52 in the recordable disk, illustrated in a linear version from the inner circumference region to the outer circumference region of substrate 51. It is to be particularly noted that marks 53 and pits 52 are aligned in the lead-in region.

Mark 55 can be written in either or both of the groove and land. In the example of FIG. 13A, marks 55 are written in groove 54. The lead-in region is provided at the inner circumference side of the disk, and the user region is provided at its outer circumference side. In the lead-in region, recorded are the disk ID (identification information), the address information of the user region, and the scramble key or encryption key in the case where the information written in the user region is scrambled or encrypted.

The user region is recorded with main information such as video and audio data. When the contents are copyrighted, the main information is recorded in a scrambled or encrypted manner.

FIG. 13B schematically shows the cross section of the disk corresponding to mark string 56 and pit string 53 of FIG. 13A. Pit 52 is formed as a hole with a constant depth. In contrast to the formation of a hole as for pit 52, mark 55 is provided so that the reflectance of light differs between a mark portion 55 and a non-mark portion 58 in a recording layer 57 provided on substrate 51.

Although the depths of groove 54 and pit 52 may be identical, it is preferable for a shallower groove 54 for the purpose of improving the signal quality of mark 55. If the signal quality of pit 52 is to be set more favorable, a depth of approximately $\lambda/4n$ is preferable, as will be described afterwards. Therefore, it is preferable to form the pit deeper than the groove. Here, $\lambda$ is the wavelength of light, and n is the refractive index of the disk substrate.

FIG. 13C shows an RF signal representing the quantity of reflected light obtained by reproducing mark string 56 and pit string 53 with a reproduction light beam. FIG. 13C corresponds to the case where the reflectance of mark portion 55 is smaller than the reflectance of non-mark portion 58.

FIG. 13D represents a TPP signal obtained by reproducing mark string 56 and pit string 53. Since mark 55 in groove 54 as well as pit 52 are formed with the same constant depth, a TPP signal that changes with the same polarity can be obtained from any mark and pit.

In the present third conventional example, the relationship between pit 52 and the beam spot is similar to that of the first conventional example shown in FIGS. 8A and 8B. Therefore, the RF signal and TPP signal are obtained by the following equations using respective outputs A and B of photoreceptor elements 36a and 36b of detector 37.

$$RF = A + B$$

$$TPP = A - B$$

An RF signal as shown in FIG. 13C is obtained since the quantity of reflected light of the light beam is small at the pit portion and large at the non-pit portion whereas the reflectance is small at the mark portion and large at the non-mark portion. Referring to FIG. 13D, a TPP signal that changes at the same polarity from any pit can be obtained as will be described afterwards since pits 52 are formed with the constant depth. The TPP signal obtained from the mark portion and the TPP signal obtained from the pit portion have the same polarity.

In the above-described conventional ROM disk, a greater capacity (larger region) is required for the lead-in region as the amount of information written in the lead-in region increases. There was a problem that the region where user data can be recorded on the disk is reduced. Similarly in the above-described conventional recordable disk, a greater capacity (larger region) is required for the lead-in region as the amount of information written in the lead-in region increases. There was a problem that the region where the user can write data on the disk is reduced.

From the standpoint of copyright protection, it is not desirable for the information in a ROM disk recorded with copyrighted contents to be easily copied to another recordable disk. However, since the conventional ROM disk has information recorded in the dimension of the plane direction of the substrate using pits, it is theoretically possible to copy the information in a ROM disk to another recordable disk. The role of copyright protection is low. Similarly in a conventional recordable disk, information in the recordable disk can be easily copied to another recordable disk in theory since information is recorded in the dimension of the plane direction of the substrate using pits, marks, and the like. The role of copyright protection is low.

SUMMARY OF THE INVENTION

An object of the present invention is to provide an optical recording medium and a reproduction method and apparatus thereof that allows the capacity of the lead-in region to be increased while reserving sufficient region for usage by a user without enlarging the lead-in region.

Another object of the present invention is to provide an optical recording medium and a reproduction method and apparatus thereof that can prevent copying of a read only disk or recordable disk that is recorded with copyrighted contents.

According to an aspect of the present invention, an optical recording medium recorded with information on a substrate includes a first region having first information recorded at least in a depth direction of a plane direction and depth direction of the substrate, and a second region having second information recorded in the plane direction of the substrate.

According to the present invention, more information can be recorded in the first region since the recording density can be increased in the first region where information is recorded in the depth direction as compared with a convention optical recording medium.

Since the first information in the first region is recorded in the depth direction, copying to another recordable medium that records information in the plane direction can be prevented.

According to another aspect of the present invention, a reproduction method of an optical recording medium recorded with information on a substrate is provided. The optical recording medium includes a first region having first information recorded at least in the depth direction of the substrate by pits of at least two different depths formed on the substrate, and a second region having second information recorded in a plane direction of the substrate by at least one of the presence/absence, the length, the width and the position of a pit formed on the substrate. The reproduction method of an optical recording medium includes the steps of reproducing the first information in the first region based on a polarity of a tangential push-pull signal obtained from the pits, the polarity differing according to the depth of a pit, and reproducing the second information in the second region based on a signal representing a quantity of reflected light obtained from the pit.

Since the first information is reproduced based on a tangential push-pull signal in the present invention, multivalued information can now be reproduced that was not possible by the conventional reproduction method that reproduces binary information based on only a signal representing the quantity of reflected light. Also, since the second information is reproduced based on a signal representing the quantity of reflected light in the second region, a conventional reproduction circuit can be used for the reproduction circuit of this region. Accordingly, the cost of the reproduction apparatus can be reduced.

According to a further aspect of the present invention, a reproduction method of a optical recording medium recorded with information on a substrate is provided. The optical recording medium includes a first region having first information recorded at least in a depth direction of the substrate by pits of at least two different depths formed on the substrate, and a second region having second information recorded in a plane direction of the substrate by at least one of the presence/absence, the length, the width and the position of a pit formed on the substrate. The reproduction method of an optical recording medium includes the steps of reproducing the first information in the first region based on a signal representing a quantity of reflected light obtained from the pit and a polarity of a tangential push-pull signal obtained from the pits, the polarity differing according to the depth of a pit, and reproducing second information in the second region based on the signal representing the quantity of reflected light obtained from the pit.

Since the first information is reproduced based on a signal representing the quantity of reflected light obtained from a pit and a tangential push-pull signal in the present invention, multivalued information can now be reproduced that was not possible by the conventional reproduction method that reproduces binary information based on only a signal representing the quantity of reflected light. Also, since the second information is reproduced based on a signal representing the quantity of reflected light in the second region, a conventional reproduction circuit can be used for the reproduction circuit of this region. Accordingly, the cost of the reproduction apparatus can be reduced.

According to still another aspect of the present invention, a reproduction apparatus of an optical recording medium recorded with information on a substrate is provided. The optical recording medium includes a first region having first information recorded at least in a depth direction of the substrate by pits of at least two different depths formed on the substrate, and a second region having second information recorded in a plane direction of the substrate by at least one of the presence/absence, the length, the width and the position of a pit formed on the substrate. The reproduction apparatus of the optical recording medium includes a circuit reproducing the first information in the first region based on a polarity of a tangential push-pull signal obtained from the pits, the polarity differing according to the depth of a pit, and a circuit reproducing the second information in the second region based on a signal representing the quantity of reflected light obtained from the pit.

Since the first information is reproduced based on a tangential push-pull signal in the present invention, multivalued information can now be reproduced that was not possible by the conventional reproduction apparatus that reproduces binary information based on only a signal representing the quantity of reflected light. Also, since the second information is reproduced based on a signal representing the quantity of reflected light in the second region, a conventional reproduction circuit can be used for the reproduction circuit of this region. Accordingly, the cost of the reproduction apparatus can be reduced.

According to a still further aspect of the present invention, a reproduction apparatus of an optical recording medium recorded with information on a substrate is provided. The optical recording medium includes a first region having first information recorded in at least in a depth direction of the substrate by pits of at least two different depths formed on the substrate, and a second region having second information recorded in a plane direction of the substrate by at least one of the presence/absence, the length, the width and the position of a pit formed on the substrate. The reproduction apparatus of the optical recording medium includes a circuit reproducing the first information in the first region based on a signal representing a quantity of reflected light obtained from the pit, and a polarity of a tangential push-pull signal obtained from the pits, the polarity differing according to the depth of a pit, and a circuit reproducing the second information in the second region based on the signal representing the quantity of reflected light obtained from the pit.

Since the first information is reproduced based on a signal representing the quantity of reflected light obtained from a pit and a tangential push-pull signal in the present invention, multivalued information can now be reproduced that was not possible by the conventional reproduction apparatus that reproduces binary information based on only a signal representing the quantity of reflected light. Also, since the second information is reproduced based on a signal representing the quantity of reflected light in the second region, a conventional reproduction circuit can be used for the reproduction circuit of this region. Accordingly, the cost of the reproduction apparatus can be reduced.

According to yet a further aspect of the present invention, a recorded information identification method of an optical recording medium recorded with information on a substrate is provided. The optical recording medium includes a region in which the presence of pits of at least two different depths formed on the substrate indicates identification information that is unique to the optical recording medium. The recorded information identification method includes the steps of detecting a polarity of a tangential push-pull signal obtained from the pits, the polarity differing according to the depth of a pit, and identifying the unique identification information based on the detected polarity.

In an optical recording medium in which the presence of pits of different depths indicates identification information that is unique to that optical recording medium of the present invention, the optical recording medium is identified based on the polarity of the tangential push-pull signal obtained from the pits. Therefore, the optical recording medium can be identified reliably.

According to yet another aspect of the present invention, a recorded information identification apparatus of an optical recording medium recorded with information on a substrate is provided. The optical recording medium includes a region in which the presence of pits having at least two different depths formed on the substrate indicates identification information that is unique to the optical recording medium. The recorded information identification apparatus includes a circuit detecting a polarity of a tangential push-pull signal obtained from the pits, the polarity differing according to the depth of a pit, and a circuit identifying the unique identification information based on the detected polarity.

In an optical recording medium in which the presence of pits of different depths indicates identification information that is unique to the optical recording medium of the present invention, the optical recording medium is identified based on the polarity of the tangential push-pull signal obtained from the pits. Therefore, the optical recording medium can be identified reliably.

According to yet a still further aspect of the present invention, an optical recording medium that can have information recorded on a substrate includes a first region having first information recorded at least in a depth direction of a plane direction and depth direction of the substrate, and a second region than can have second information recorded in the plane direction of the substrate.

According to the present invention, more information can be recorded in the first region since the recording density can be increased in the first region where information is recorded in the depth direction as compared with a convention optical recording medium.

Since the first information in the first region is recorded in the depth direction, copying to another recordable medium that records information in the plane direction can be prevented.

According to an additional aspect of the present invention, a reproduction method of an optical recording medium that can have information recorded on a substrate is provided. The optical recording in medium includes a first region having first information recorded at least in a depth direction of the substrate by pits of at least two different depths formed on the substrate, and a second region that can have second information recorded in a plane direction of the substrate by at least one of the presence/absence, the length, the width and the position of a mark formed on the substrate. The reproduction method of an optical recording medium includes the steps of reproducing the first information in the first region based on a polarity of a tangential push-pull signal obtained from the pits, the polarity differing according to the depth of a pit, and reproducing the second information in the second region based on a signal representing a quantity of reflected light obtained from the mark.

Since the first information is reproduced based on a tangential push-pull signal in the present invention, multivalued information can now be reproduced that was not possible by the conventional reproduction method that reproduces binary information based on only a signal representing the quantity of reflected light. Also, since the second information is reproduced based on a signal representing the quantity of reflected light from a mark in the second region, a conventional reproduction circuit can be used for the reproduction circuit of this region. Accordingly, the cost of the reproduction apparatus can be reduced.

According to another aspect of the present invention, a reproduction method of an optical recording medium that can have information recorded on a substrate is provided. The optical recording medium includes a first region having first information recorded at least in a depth direction of the substrate by pits of at least two different depths formed on the substrate, and a second region that can have second information recorded in a plane direction of the substrate by at least one of the presence/absence, the length, the width and the position of a mark formed on the substrate. The reproduction method of an optical recording medium includes the steps of reproducing the first information in the first region based on a signal representing a quantity of reflected light obtained from the pit and a polarity of a tangential push-pull signal obtained from the pits, the polarity differing according to the depth of a pit, and reproducing the second information in the second region based on the signal representing the quantity of reflected light obtained from a mark.

Since the first information is reproduced based on a signal representing the quantity of reflected light obtained from a pit and a tangential push-pull signal in the present invention, multivalued information can now be reproduced that was not possible by the conventional reproduction method that reproduces binary information based on only a signal representing the quantity of reflected light. Also, since the second information is reproduced based on a signal representing the quantity of reflected light from a mark in the second region, a conventional reproduction circuit can be used for the reproduction circuit of this region. Accordingly, the cost of the reproduction apparatus can be reduced.

According to a further aspect of the present invention, a reproduction apparatus of an optical recording medium that can have information recorded on a substrate is provided. The optical recording medium includes a first region having first information recorded at least in a depth direction of the substrate by pits of at least two different depths formed on the substrate, and a second region that can have second information recorded in a plane direction of the substrate by at least one of the absence/presence, the length, the width and the position of a mark formed on the substrate. The reproduction apparatus of the optical recording medium includes a circuit reproducing the first information in the first region based on a polarity of a tangential push-pull signal obtained from the pits, the polarity differing according to the depth of a pit, and a circuit reproducing the second information in the second region based on a signal representing the quantity of reflected light obtained from a mark.

Since the first information is reproduced based on a tangential push-pull signal in the present invention, multi-valued information can now be reproduced that was not possible by the conventional reproduction apparatus that reproduces binary information based on only a signal representing the quantity of reflected light. Also, since the second information is reproduced based on a signal representing the quantity of reflected light in the second region, a conventional reproduction circuit can be used for the reproduction circuit of this region. Accordingly, the cost of the reproduction apparatus can be reduced.

According to still another aspect of the present invention, a reproduction apparatus of an optical recording medium that can have information recorded on a substrate is provided. The optical recording medium includes a first region having first information recorded at least in a depth direction of the substrate by pits of at least two different depths formed on the substrate, and a second region that can have second information recorded in a plane direction of the substrate by at least one of the presence/absence, the length, the width and the position of a mark formed on the substrate. The reproduction apparatus of the optical recording medium includes a circuit reproducing the first information in the first region based on a signal representing a quantity of reflected light obtained from the pit and a polarity of a tangential push-pull signal obtained from the pits, the polarity differing according to the depth of a pit, and a circuit reproducing the second information in the second region based on the signal representing the quantity of reflected light obtained from a mark.

Since the first information is reproduced based on a signal representing the quantity of reflected light from a pit and a tangential push-pull signal in the present invention, multi-valued information can now be reproduced that was not possible by the conventional reproduction apparatus that reproduces binary information based on only a signal representing the quantity of reflected light. Also, since the second information is reproduced based on a signal representing the quantity of reflected light in the second region, a conventional reproduction circuit can be used for the reproduction circuit of this region. Accordingly, the cost of the reproduction apparatus can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A–7D schematically show the relationship between the structure of a conventional optical disk of FIG. 6 and signals obtained therefrom.

FIGS. 13A–13D schematically show the relationship between a structure of a conventional optical disk of FIG. 12 and signals obtained therefrom.

DESCRIPTION OF THE PREFERRED EMBODIMENTS

As previously described in the section of the related art, binary recording is generally used that records information according to the presence/absence, the length, the width, or the position in the substrate plane of pits, marks, and the like in an optical disk. However, information of larger capacity can be recorded if information can be provided additionally in the depth direction of the pit. Such a technique is already proposed in a copending U.S. patent application Ser. No. 09/606282 by the inventors of the present invention. The technique is directed to additionally include information in the pit depth taking advantage of the fact that the diffraction pattern caused by light interference generated in a pit that has a recessed and protruded configuration differs depending upon the pit depth.

Figure 8A:
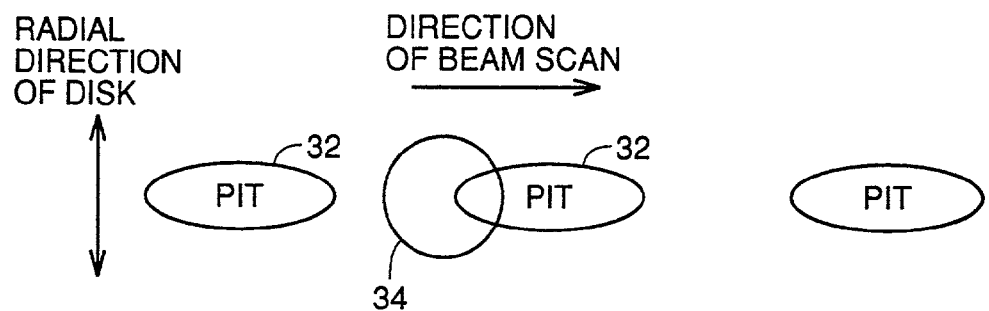
FIGS. 8A and 8B schematically show the manner of a light beam spot running over a pit string and the manner of a detector receiving reflected light of the light beam spot.
Figure 8B:
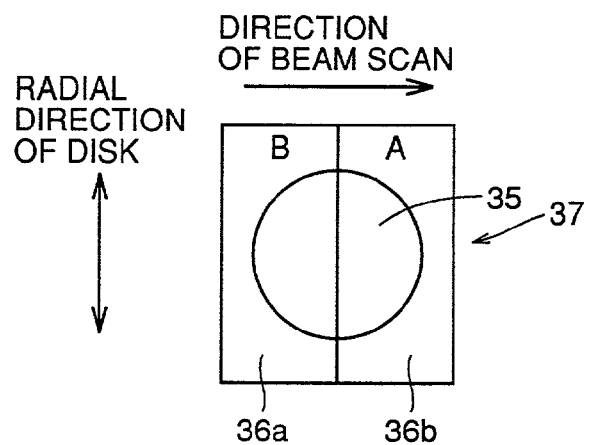
Figure 9:
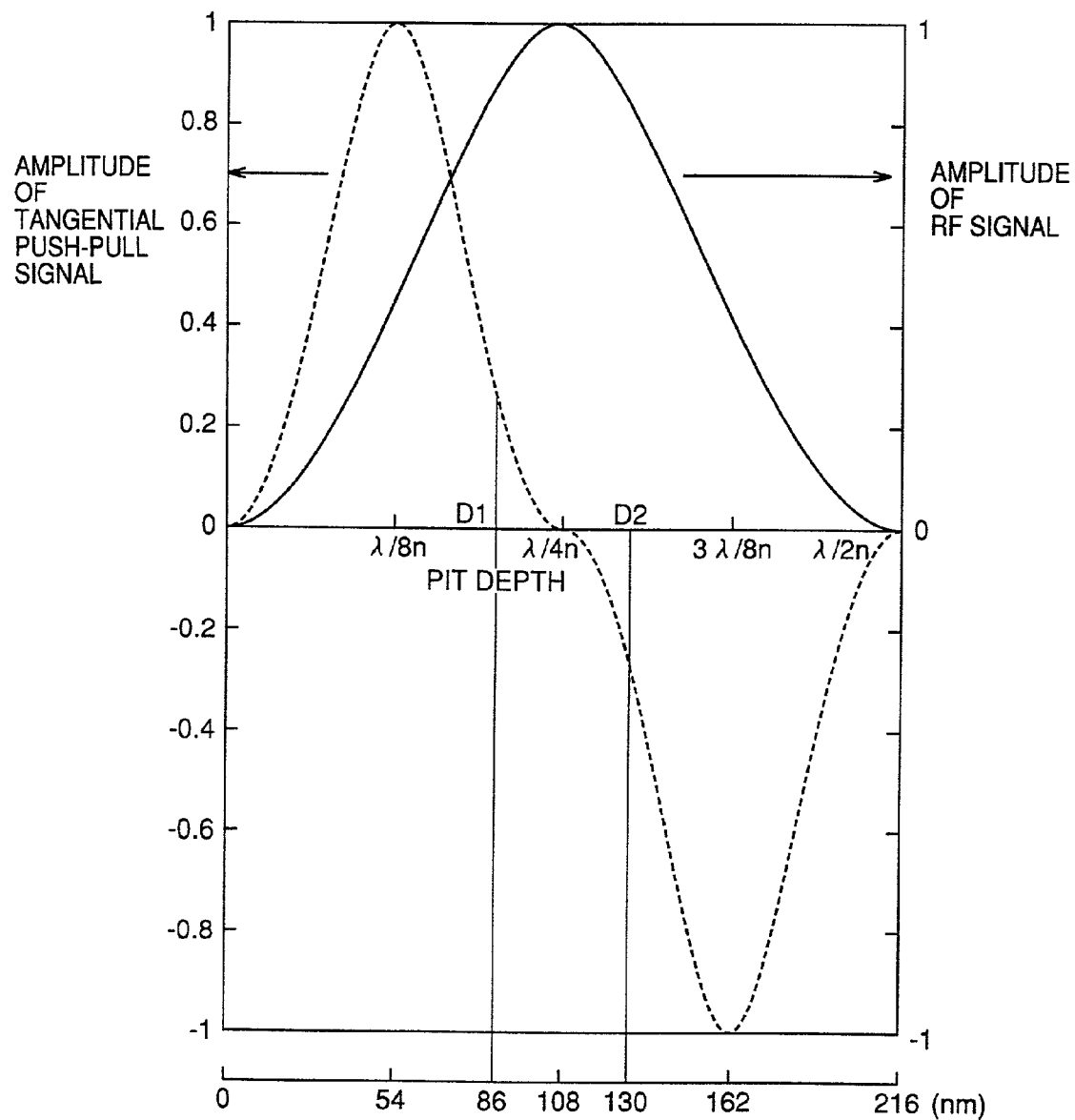
FIG. 9 is a graph representing the relationship among the pit depth, TPP signal amplitude and RF signal amplitude.

FIG. 9 is a graph representing the relationship of the depth of, for example, pit 32 shown in FIG. 8A with respect to the amplitudes of an RF signal and TPP signal obtained therefrom. The depth of pit 32 is plotted along the horizontal axis with the wavelength $\lambda$ of the light beam used for reproduction as the reference. In the graph, n is the refractive index of the substrate of the optical disk. In the present example, experiments are carried out as to an optical disk including a transparent substrate having a thickness of 0.6 mm and a refractive index of 1.5 using a reproduction light beam of 650 nm in wavelength and an optical system having a numerical aperture (NA) of 0.65.

Referring to FIG. 9, the amplitude of an RF signal exhibits the maximum value when the pit depth is $\lambda/4n$ (108 nm). The vertical axis at the right side in FIG. 9 is a normalized amplitude of the RF signal with 1 as the maximum value. The amplitude of the TPP signal exhibits the maximum value when the pit depth is $\lambda/8n$ (54 nm). The vertical axis at the left side in FIG. 9 is a normalized amplitude of the TPP signal with 1 as the maximum value. The TPP signal has its polarity inverted at the border of pit length $\lambda/4n$. To clearly show this inversion, the sign of the TPP signal is set negative in the range of λ/4n (108 nm)<pit depth <λ/2n (216 nm).

Figure 10:
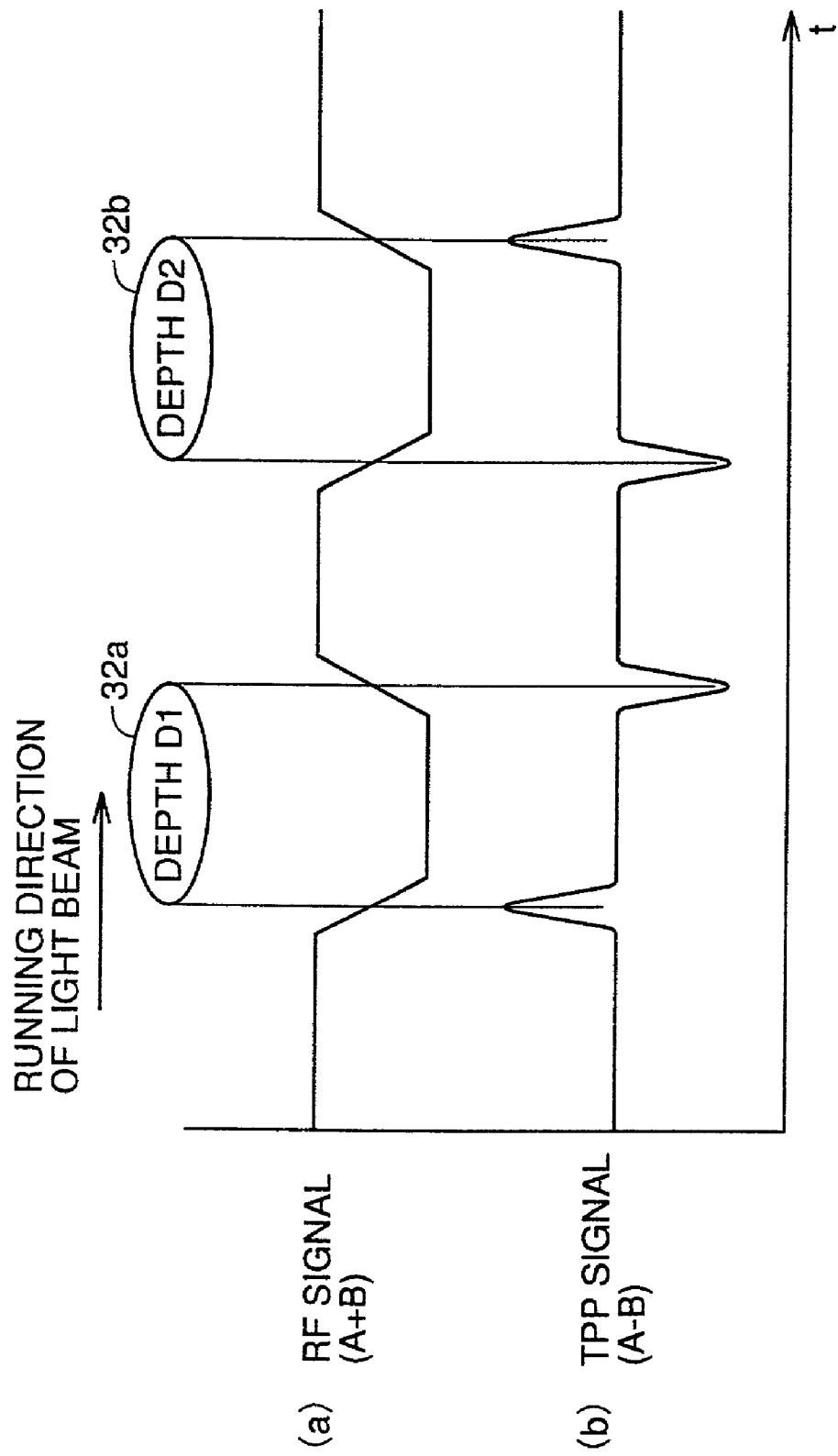
FIG. 10 is a timing chart representing the relationship among the pit depth, RF signal and TPP signal.
Figure 11:
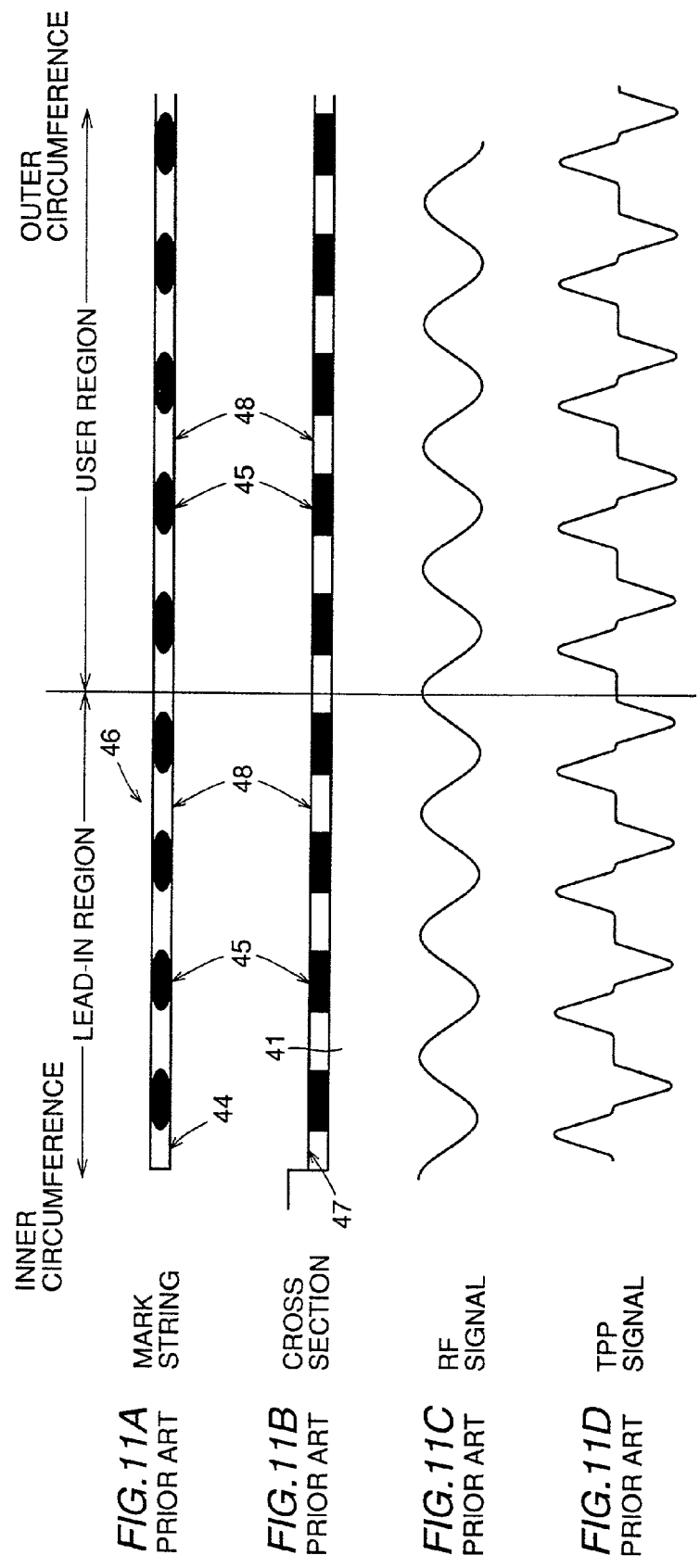
FIGS. 11A–11D schematically show the relationship between the structure of an optical disk according to another conventional example and signals obtained therefrom.
Figure 12:
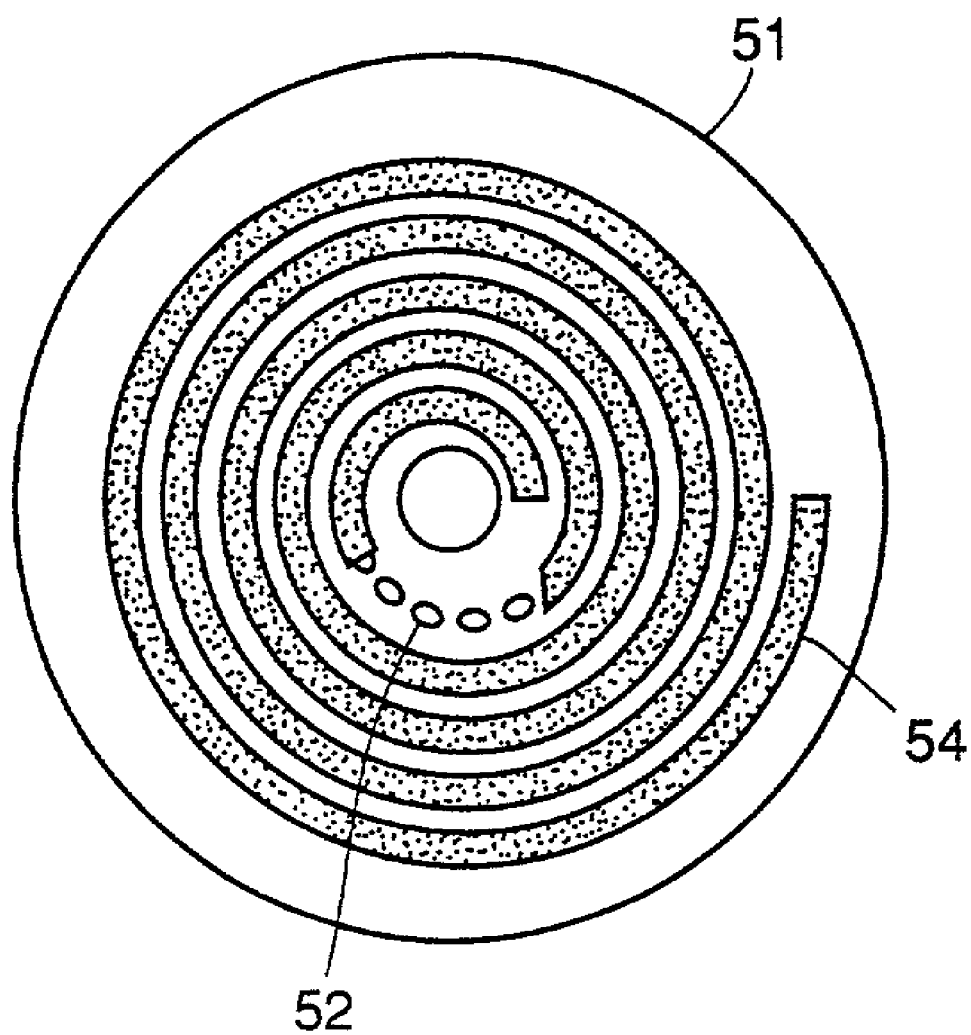
FIG. 12 is a schematic diagram showing a recordable disk of another conventional example in an unrecorded state.

The polarity inversion of the TPP signal will be described hereinafter with reference to FIGS. 9 and 10. It is assumed that pits 32a and 32b of FIG. 10 have a depth D1 (86 nm) and a depth D2 (130 nm), respectively. FIG. 10 represents the waveforms of the RF signal and TPP signal obtained when a string of pits of such different depths is reproduced. In FIG. 10, the light beam moves from the left side to the right side. As shown in (a) of FIG. 10, the RF signal exhibits a smaller quantity of reflected light in the pit portion than in the non-pit portion in the pits of all depths. As to pit 32a of depth D1, as shown in FIG. 10(b), the TPP signal exhibits a pulse in the positive direction (upwards in FIG. 10) at the leading edge of pit 32a, and then exhibits a pulse in the negative direction (downwards in FIG. 10) at the trailing edge of pit 32a. As to pit 32b of depth D2, the TPP signal exhibits a pulse in the negative direction (downwards in FIG. 10) at the leading edge of pit 32b and then a pulse in the positive direction (upwards in FIG. 10) at the trailing edge of pit 32b. This phenomenon is referred to as the inversion of the polarity of the TPP signal. In FIG. 9, the polarity of the TPP signal obtained at pit 32a of depth D1 is represented as positive and the opposite polarity of the TPP signal is represented as negative.

Embodiments of the present invention will be described hereinafter based on this polarity inversion of a TPP signal according to the above-described different pit depth.

First Embodiment

An optical recording medium and a reproduction method and apparatus thereof according to a first embodiment of the present invention will be described hereinafter. FIGS. 1A and 1B schematically show a structure of a pit string on a ROM disk as an example of an optical recording medium in the first embodiment. FIGS. 1C and 1D represent the waveforms of signals obtained by reproducing information from the ROM disk.

More specifically, FIG. 1A schematically shows pit string 3 constituted by two types of pits 2a and 2b, illustrated in a linear version from the inner circumference region to the outer circumference region of the disk. FIG. 1B schematically shows the cross section of the disk, corresponding to pit string 3 of FIG. 1A. Referring to FIG. 1B, the lead-in region is formed of relatively shallow pits 2a (depth D1) and relatively deep pits 2b (depth D2). The user region is formed of pits 2a of a constant depth (depth D1). FIG. 1C shows an RF signal representing the quantity of reflected light obtained by reproducing pit string 3 with a reproduction light beam. The quantity of reflected light is smaller in the pit portion than in the non-pit portion. FIG. 1D shows a TPP signal obtained by reproducing pit string 3 with the reproduction light beam. As shown in FIG. 1B, the lead-in region is formed of pits 2a and 2b that have depth differing from each other. As described previously in relation to FIGS. 9 and 10, the polarity of the obtained TPP signal is inverted between relatively shallow pit 2a and relatively deep pit 2b. More specifically, by forming the lead-in region with pits 2a and 2b of two different depths in the first embodiment, information can be recorded in the depth direction of the disk substrate taking advantage of the positive and negative values that are easily determined as to the polarity of the TPP signal.

These two pit depths (D1, D2) are to be set so that RF signals of the same amplitude and TPP signals of different polarity are obtained from pits 2a and 2b. More specifically, it will be understood from the graph of FIG. 9 that the depths (D1, D2) are to be set so as to satisfy:

$$\lambda/8n < D1 < \lambda/4n \text{ and } \lambda/4n < D2 < 3\lambda/8n$$

where λ is the wavelength of the reproduction light beam and n is the refractive index of the substrate.

The reproduction method and reproduction apparatus of information recorded in a lead-in region formed of two different types of pits 2a and 2b having different depths and in a user region formed of one type of pits 2a having a constant depth will be described with reference to FIGS. 2 and 3.

Figure 1:
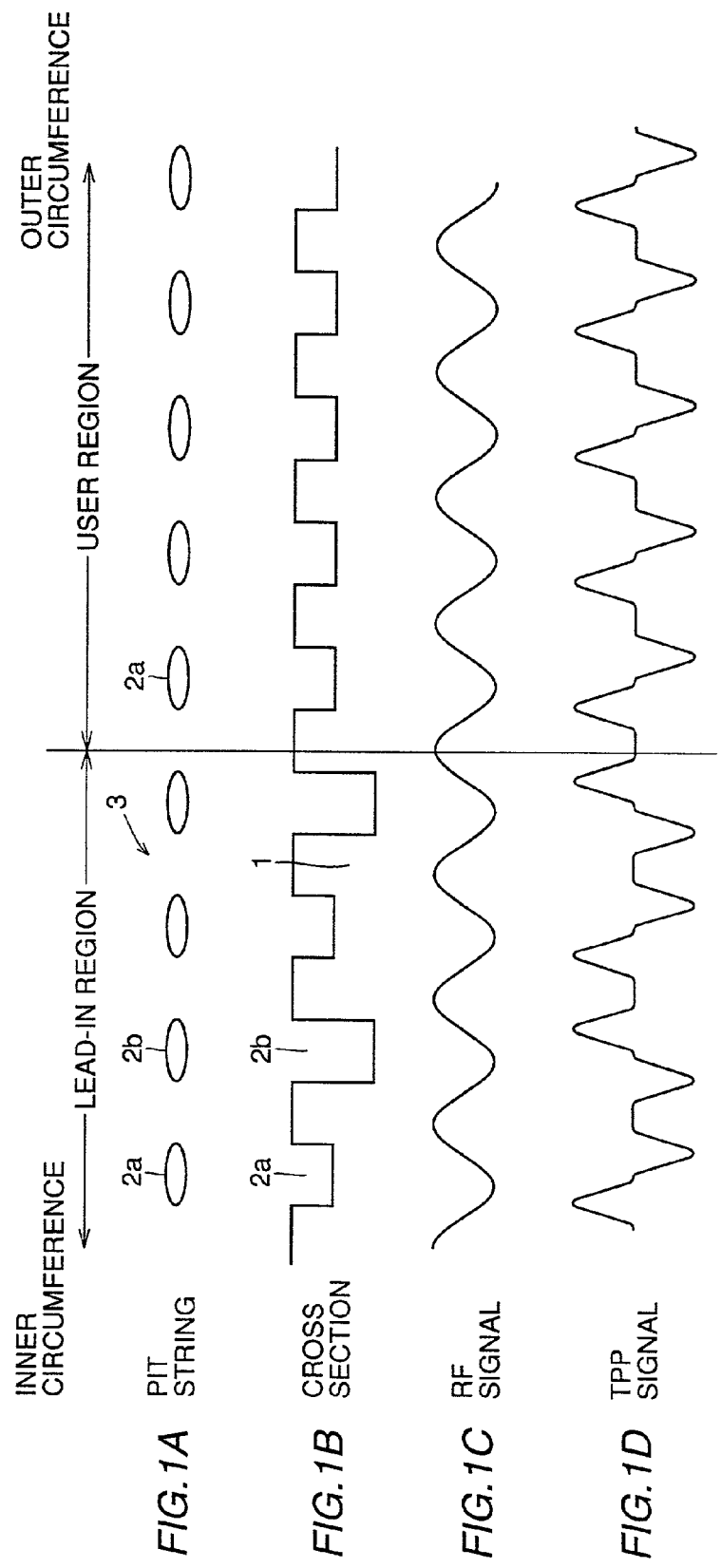
FIGS. 1A–1D schematically show the relationship between the structure of an optical disk and signals obtained therefrom according to a first embodiment of the present invention.
Figure 2:
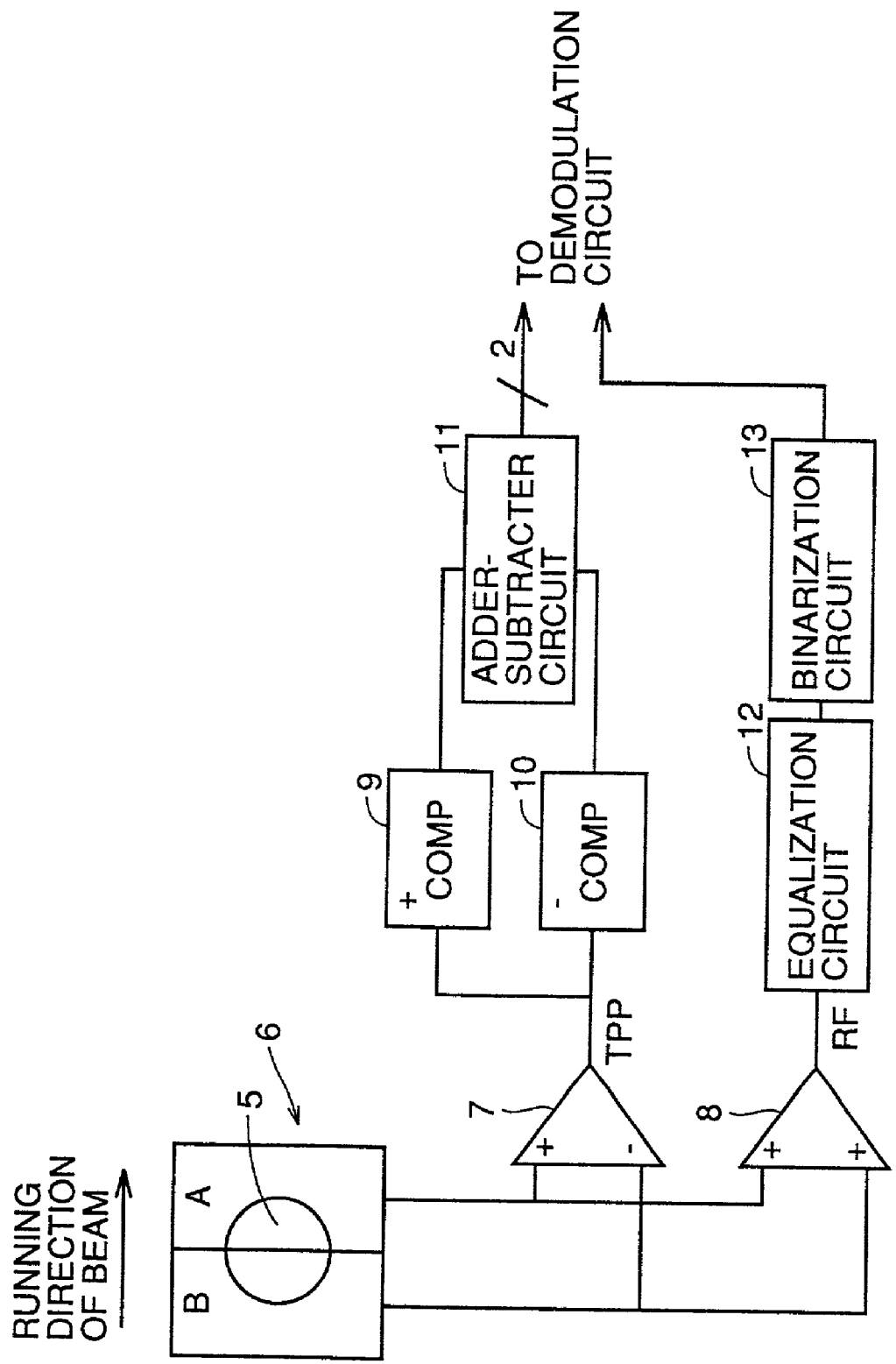
FIG. 2 is a block diagram representing a circuit configuration of the main part of an optical disk reproduction apparatus according to the first embodiment of the present invention.

FIG. 2 is a schematic block diagram showing a circuit configuration of the main part of a reproduction apparatus of the ROM disk shown in FIG. 1. FIG. 3 is a timing chart representing the operation of the reproduction apparatus of FIG. 2.

Figure 3:
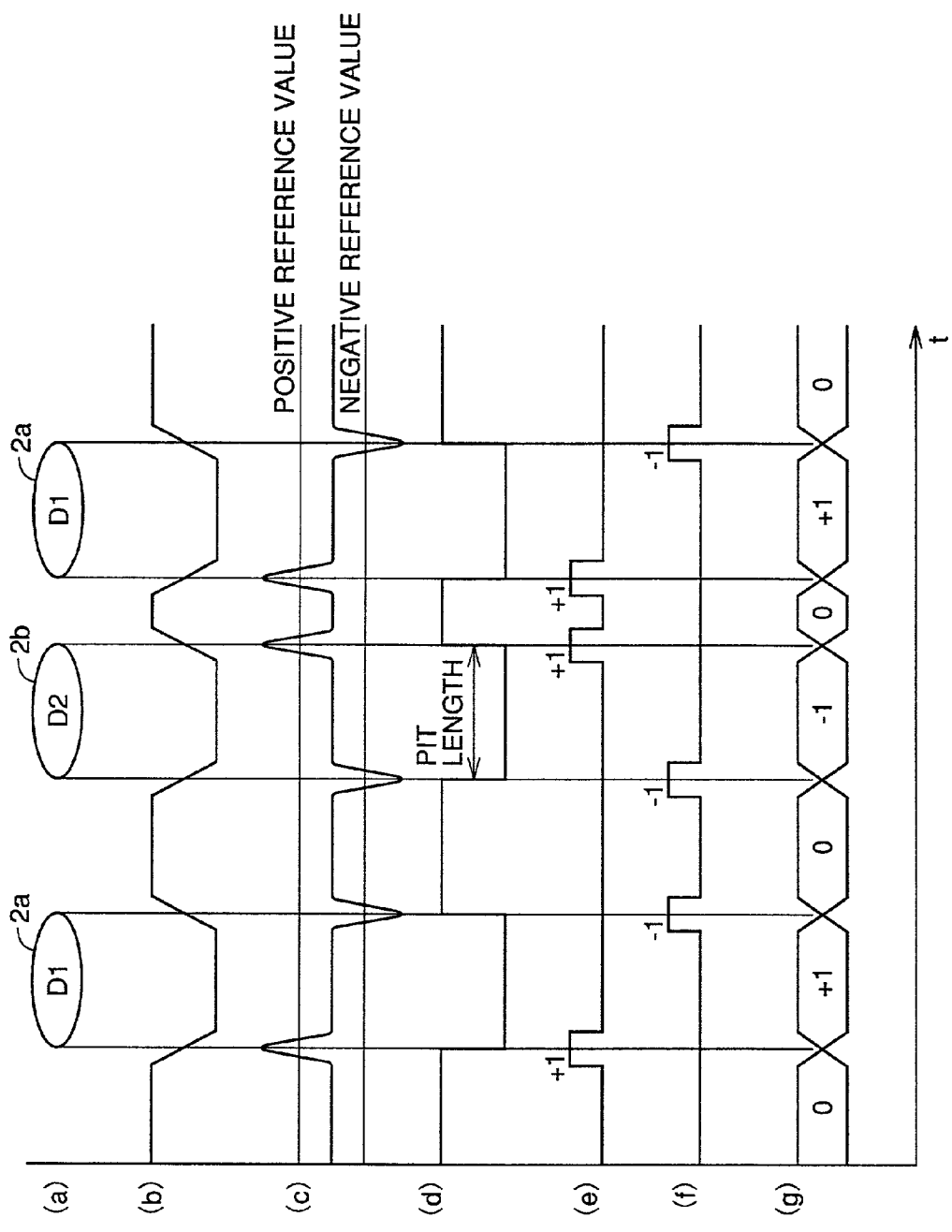
FIG. 3 is a timing chart of the operation of the optical disk reproduction apparatus according to the first embodiment of FIG. 2.

Description is based on the case where two types of pits 2a and 2b arranged as shown in FIG. 3(a) are to be reproduced. It is assumed that the depths of the pit are D1, D2 and D1 from left to right in the example of FIG. 3.

Referring to FIG. 2, the outputs obtained from respective regions A and B by directing reflected light 5 of reproduction beam spot from the disk to regions A and B of a detector 6 are both provided to a differential amplifier 7 and an addition amplifier 8. Differential amplifier 7 obtains the difference between the outputs of regions A and B of detector 6 to provide the difference as the TPP signal shown in FIG. 3(c). Addition amplifier 8 obtains the total sum of the outputs of regions A and B of detector 6 to provide the obtained value as the RF signal of FIG. 3(b).

As to the RF signals indicating the quantity of reflected light of the light beam (FIG. 3(b)), a correction process of the frequency characteristics and the like is carried out by an equalization circuit 12 on an RF signal reproduced from a pit of a particularly short length. As shown in FIG. 3(d), the output of equalization circuit 12 is binarized by a binarization circuit 13 and then provided to a demodulation circuit not shown to be subjected to the general demodulation process.

The TPP signal (FIG. 3(c)) is applied to both comparators 9 and 10. Comparator 9 compares the input TPP signal with a preset positive reference value. When the TPP signal is greater than the reference value (i.e., the sign of the TPP signal is positive and the absolute value thereof is great), one pulse (+1) is generated as shown in FIG. 3(e) and provided to one input of an adder-subtracter circuit 11. Similarly, comparator 10 compares the input TPP signal with a preset negative reference value. When the TPP signal is smaller than the reference value (i.e., the sign of the TPP signal is negative and the absolute value thereof is large), one pulse (−1) is generated as shown in FIG. 3(f) and provided to the other input of adder-subtracter circuit 11.

Adder-subtracter circuit 11 accumulates respective pulses from comparators 9 and 10 to output a signal indicating any one of the three statuses of −1, 0, +1 obtained each time, as shown in FIG. 3(g), as an output signal of two bits. Similar to the RF signal, the output signal is provided to a demodulation circuit not shown to be subjected to the general demodulation process.

More specifically, adder-subtracter circuit 11 operates (in the example of FIG. 3, adding operation including the polarity thereof is carried out) on the pair of pulse strings ((e) and (f) in FIG. 3) obtained by binarizing TPP signals by comparators 9 and 10. Based on the operation result, the two statuses of −1 or +1 can be restored according to the pit depths in the pit portion (more specifically, the generation sequence of positive and negative pulses based on the TPP signal), and the one status of 0 can be restored in the non-pit portion. Therefore, information of a total of three values can be recorded and reproduced depending upon the absence/ presence and the depth of the pit. As a result, the recording density of information on an optical recording medium can be improved significantly as compared with the conventional so-called binary recording.

In the user region of the disk, a reproducing operation similar to that of the conventional binary recorded information is to be carried out since all the pits have the same depth (D1). Referring to FIG. 3(c), in the pit of depth D1, a positive TPP signal and a negative TPP signal are generated when the beam spot is located at the leading edge and trailing edge of the pit, respectively. By adding the pulses, including the signs, of (e) and (f) of FIG. 3 that are obtained by binarizing these positive and negative TPP signals using adder-subtracter circuit 11, a signal of the two status of +1 at the pit portion and 0 at the non-pit portion can be obtained. Therefore, in the reproduction method and reproduction apparatus of the first embodiment of the present invention, the region having the main information recorded according to pits of the same depth, i.e. the user region, can have binarization information restored and reproduced. The region having another information recorded according to pits of different depths, i.e. the lead-in region, can have three-valued information restored and reproduced. The same reproduction method can be used for either region.

As to the region having the main information recorded according to pits of the same depth, i.e. as to the user region, the binarization information may be reproduced based on only a reproduced RF signal as in the conventional case. In this case, a conventional circuit can be used for the reproduction circuit of the main information. As a result, the cost of the reproduction apparatus can be reduced.

Thus, in the lead-in region of the optical recording medium according to the first embodiment of the present invention, information is recorded at least in the depth direction, or in the depth direction in addition to the plane direction of the substrate (conventional binary recording). Therefore, more information can be recorded in the lead-in region than in the conventional ROM disk that has information recorded only in the plane direction. As a result, a usable region can be preserved or expanded even if the amount of information recorded in the lead-in region is increased.

Furthermore, copyright protection can be effected by recording information in the depth direction in the lead-in region. This will be described in detail hereinafter.

As described in relation to the conventional example of FIG. 13, the polarity of the TPP signal obtained from the user region of a recordable disk is identical for all marks 55 as shown in FIG. 13D since marks 55 all have the same depth in the user region. Therefore, the information recorded in the depth direction (ternary recording) by pits 2a and 2b of different depths among the information in the lead-in region of the ROM disk recorded as shown in FIG. 1B will by no means be transferred to the user region (only binary recording possible) of the recordable disk. In other words, information in the lead-in region of the optical disk of the first embodiment will never be copied into another recordable disk.

By scrambling or encrypting the information in the user region in the optical disk of the first embodiment and recording the cancel key thereof in the lead-in region using the depth direction, the cancel key recorded in the lead-in region will by no means be copied into another recordable disk even if the information in the user region is copied into another recordable disk. This means that the information in the ROM disk according to the first embodiment of the present invention substantially cannot be copied.

It is to be noted that information unique to the disk such as disk identification (ID) information other than the cancel key may be similarly recorded in the depth direction of the lead-in region. By such recording, undesirable copying of these information to a recordable disk can be inhibited completely. In other words, illegal copy of a disk that includes copyrighted contents can be prevented.

Although the above-described first embodiment corresponds to the case where information is recorded at least in the depth direction of the lead-in region, it will be understood that the region where recording is to be effected in the depth direction is not limited to a lead-in region, and can be effected on any region of the optical disk. More specifically, it is impossible to copy information from a region where the information is recorded in the depth direction to another recordable disk. Such a region can be identified as a unique region (for example, the above-described lead-in region) in the optical disk.

The above-described embodiment is directed to a transparent substrate having a thickness of 0.6 mm and a refractive index of 1.5 using a light beam having a wavelength of 650 nm and an optical system having an NA of 0.6. However, it is apparent that the above-described effect is not limited to the type of the used optical system, substrate or the like. Furthermore, the values of the pit depths are not limited to those shown in the above embodiment. According to the principle of the present invention, it is clear that depths are to be selected so that the polarity of the TPP signal differs for respective pits. Since a recordable disk does not have a recording dimension in the depth direction, copying information from an optical disk having a region recorded with information in the depth direction according to the above-described embodiment to a recordable disk can be inhibited. It is also apparent that the specific method therefor is not limited to that described above.

Second Embodiment

Figure 4:
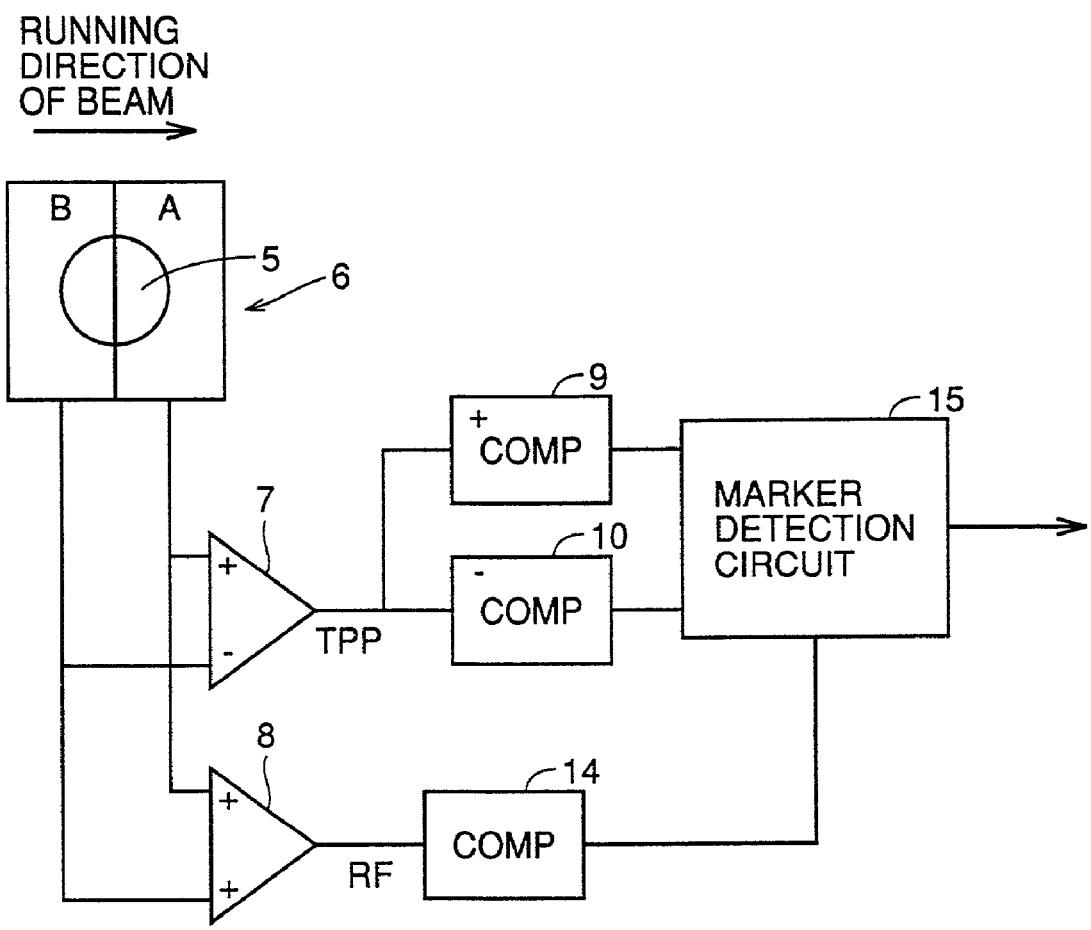
FIG. 4 is a block diagram representing a circuit configuration of the main part of an optical disk reproduction apparatus according to a second embodiment of the present invention.

Referring to FIG. 4, an identify circuit of recorded information in a reproduction apparatus of an optical recording medium according to a second embodiment of the present invention will be described with reference to FIG. 4. More particularly, FIG. 4 is a block diagram showing the circuit configuration that allows detection of the presence of pits from which a TPP signal of different polarity can be obtained on the optical disk.

Similar to the reproduction apparatus of the first embodiment shown in FIG. 2, the outputs from regions A and B of detector 6 are provided to differential amplifier 7 and addition amplifier 8. Similar to the first embodiment of FIG. 2, the TPP signal which is the output of differential amplifier 7 is applied to comparators 9 and 10. The TPP signals binarized by respective comparators 9 and 10 are applied to a marker detection circuit 15. The RF signal which is the output of addition amplifier 8 is provided to comparator 14 to be compared with a predetermined reference value. The RF signal binarized by comparator 14 is also applied to marker detection circuit 15.

Marker detection circuit 15 determines whether there is a pit that causes the polarity of the TPP signal to be inverted for respective pits based on the binarization signals (FIGS. 3(e) and (f)) output from comparators 9 and 10 and the binarization signal (FIG. 3(d)) output from comparator 14.

By the output of marker detection circuit 15, determination is made as to whether the optical recording medium subjected to reproduction is a disk having a region in which information is recorded in the depth direction. According to the second embodiment of the present invention, the presence of pits of different depths can be used as the so-called identification marker (ID) to identify that optical recording medium.

Third Embodiment

A recordable disk as an example of an optical recording medium according to a third embodiment of the present invention will be described here with reference to FIGS. 5A–5D. FIGS. 5A and 5B schematically show the structure of a mark string and pit string on a recordable disk according to the third embodiment. FIGS. 5C and 5D represent the waveforms of signals obtained by reproducing the information recorded on the disk.

In general, mark 25 is written in either or both of the groove and land. The third embodiment of FIG. 5 corresponds to the example where marks 25 are written in groove 24.

More specifically, FIG. 5A schematically shows mark strings 26 constituted by marks 25 formed in groove 24 and a pit string 23 constituted by pits 22a and 22b arranged between these mark strings, illustrated in a linear version from the inner circumference region to the outer circumference region of the disk. FIG. 5B schematically shows the cross section of the disk corresponding to mark string 26 and pit string 23 of FIG. 5A. Pit string 23 formed in the lead-in region is constituted by relatively shallow pits 22a (depth D1) and relatively deep pits 22b (depth D2). More specifically, the third embodiment is different from the conventional recordable disk shown in FIG. 13 in that the pits forming pit string 23 are formed of two types of pits, i.e. relatively shallow pits 22a and relatively deep pits 22b.

FIG. 5C shows an RF signal representing the quantity of reflected light obtained by reproducing mark string 26 and pit string 23 with a reproduction light beam. It is noted that the quantity of reflected light of the mark portion and the pit portion is smaller than the quantity of reflected light of the non-mark portion and non-pit portion.

FIG. 5D represents a TPP signal obtained by reproducing mark string 26 and pit string 23 with a reproduction light beam. The polarity of TPP signals obtained from mark 25 and relatively shallow pit 22a are identical. Only the polarity of a TPP signal obtained from relatively deep pit 22b is inverted. More specifically, by forming the lead-in region with pits 22a and 22b of two different depths, information can be recorded in the depth direction of a disk substrate taking advantage of the positive and negative values, that is, the polarity of the TPP signal, that are easy to determine.

These two different pit depths D1 and D2 are to be set so that RF signals of the same amplitude and TPP signals of different polarity are obtained from pits 22a and 22b. More specifically, similar to the first embodiment, depths D1 and D2 are to be set so as to satisfy:

$$\lambda/8n < D1 < \lambda/4n \text{ and } \lambda/4n < D2 < 3\lambda/8n$$

where $\lambda$ is the wavelength of the light beam and n is the refractive index of the substrate.

As to a reproduction method and reproduction apparatus of a signal from pit string 23 formed of pits 22a and 22b of two different types of depth and mark string 26 formed of marks 25 are substantially identical to those of the optical disk of the first embodiment described with reference to FIGS. 2 and 3. Therefore, description will not be repeated for the common elements.

More specifically, similar to the reproduction apparatus of the first embodiment, the reproduction apparatus of the third embodiment includes an adder-subtracter circuit 11 that applies an operation on a pair of pulse signals (adding operation including polarity) obtained by binarizing respective TPP signals by comparators 9 and 10. Based on the results of the operation, the two statuses of −1 or +1 can be restored according to the pit depth in the pit portion. In the non-pit portion, one status of 0 can be restored. Therefore, information of the total of three values can be recorded and reproduced depending upon the absence/presence and depth of the pit. As a result, the recording density of information on the optical recording medium can be increased significantly than by the conventional so-called binary recording.

According to the reproduction method and reproduction apparatus of the third embodiment, the RF signal and TPP signal can be shared in order to reproduce a signal from the mark portion. More specifically, referring to FIG. 5D, a positive TPP signal and a negative TPP signal are obtained when the beam spot is located at the leading edge and trailing edge, respectively, for mark 25. Therefore, similar to the reproduction apparatus of the first embodiment shown in FIG. 2, by accumulating pulse signals (FIGS. 3(e), (f)) obtained by binarizing the TPP signal at adder-subtracter circuit 11, the two statuses of +1 at the mark portion and 0 at the non-mark portion can be achieved. More specifically, binarization information for the mark portion and ternary information for the pit portions of different depths can be respectively restored and reproduced in the present reproduction method or reproduction apparatus of recorded information. The same reproduction method can be applied for either region.

Figure 5:
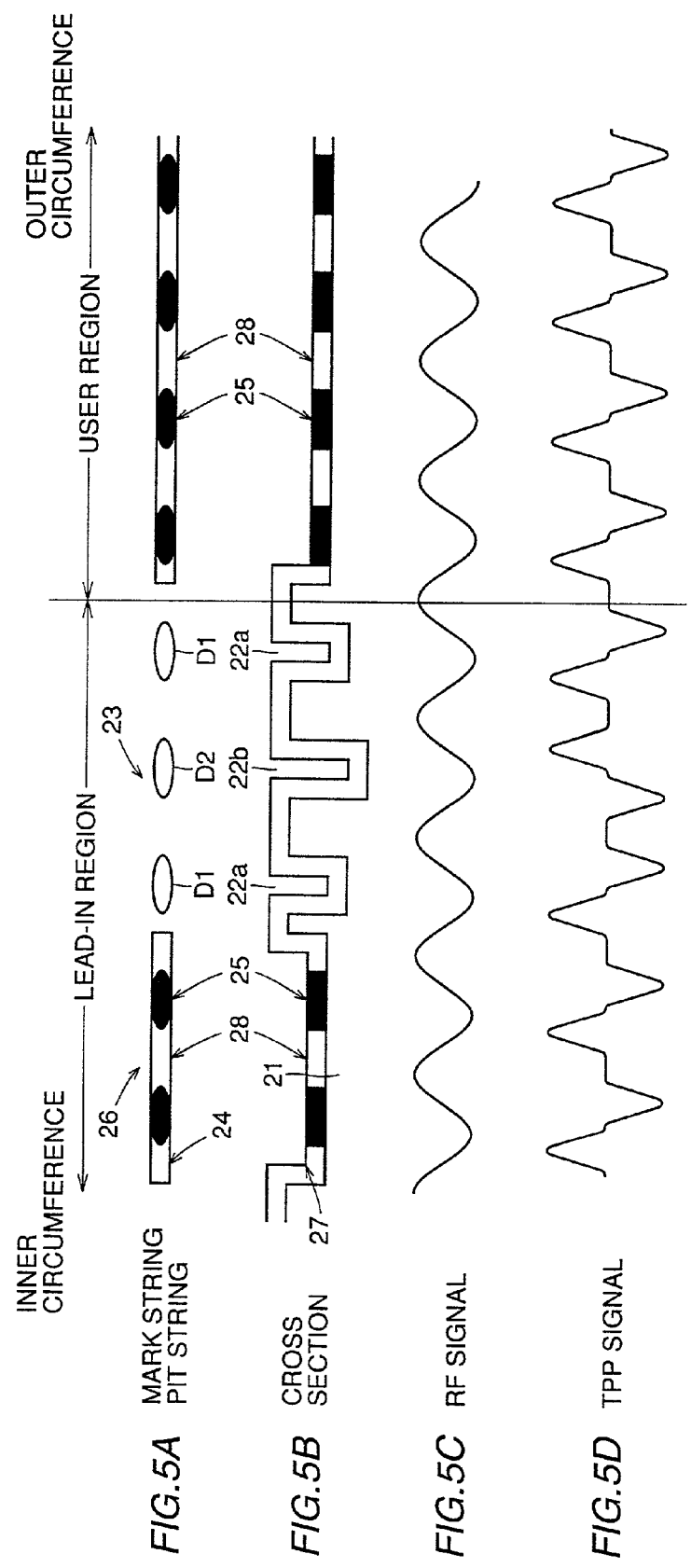
FIGS. 5A–5D schematically show the relationship between the structure of an optical disk and signals obtained therefrom according to a third embodiment of the present invention.
Figure 6:
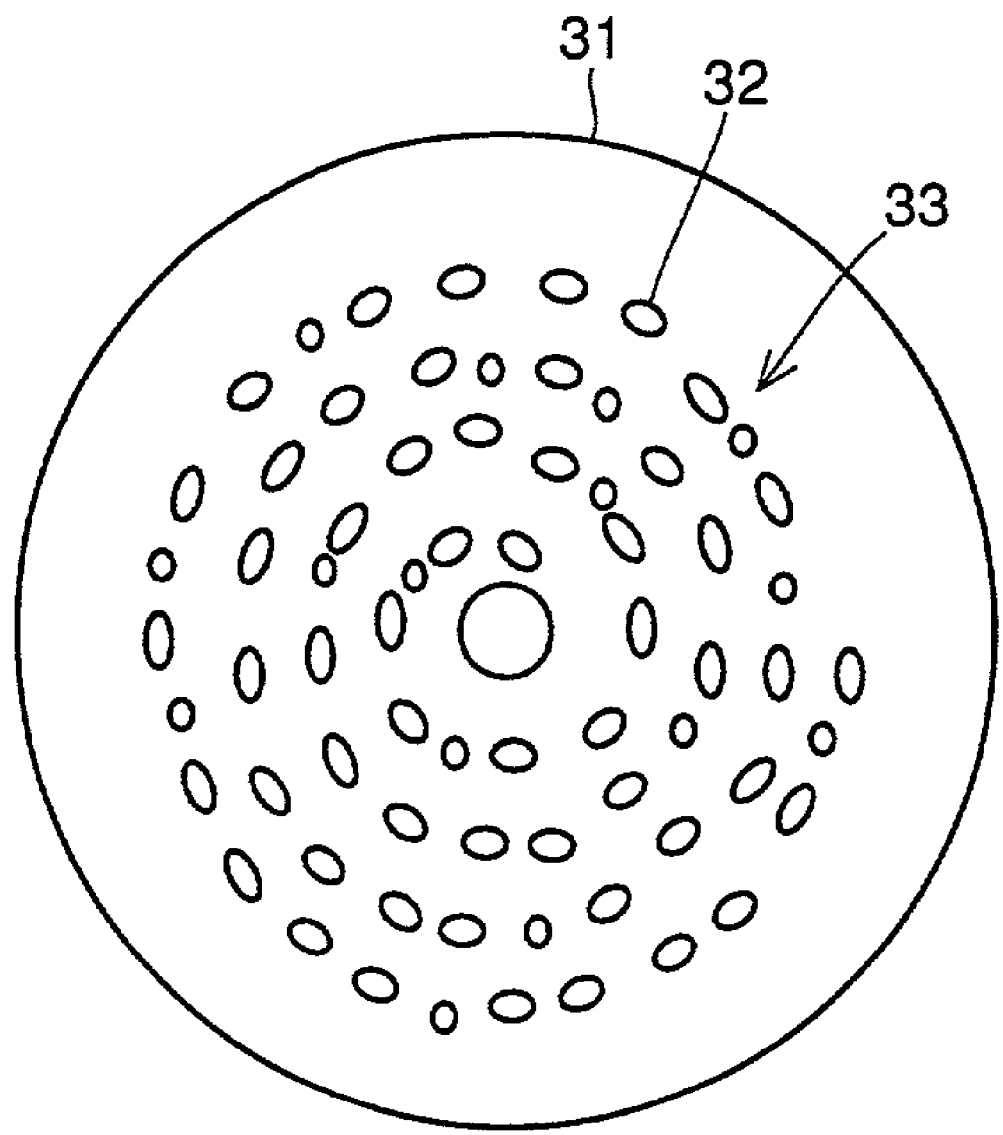
FIG. 6 schematically shows the arrangement of pits formed on a conventional ROM disk.

In the third embodiment of FIG. 5, the region where the main information is recorded with pits of the same depth, i.e., the user region, can have binarization information reproduced from only an RF signal as in the conventional case. In this case, the conventional circuit can be used for the reproduction circuit of the main information. As a result, the cost of the reproduction apparatus can be reduced.

Thus, since the lead-in region of the recordable optical disk of the third embodiment of the present invention can have information recorded at least in the depth direction, or in the depth direction in addition to the substrate plane direction (conventional binary recording), more information can be recorded in the lead-in region than in the conventional recordable disk that records information only in the plane direction. As a result, a usable region can be preserved or enlarged even if the amount of information to be recorded in the lead-in region increases.

By recording information in the depth direction in the lead-in region in the present third embodiment shown in FIG. 5, copyright protection can be effected. This will be described in detail hereinafter.

Since the depth of the recording marks in the recordable region (user region) of the recordable disk of FIG. 5 is constant, the polarity of the TPP signal is identical for all the marks as shown in FIG. 5D. Therefore, the information recorded in the depth direction by pits 22a and 22b of different depth of the recorded information in the lead-in region of the recordable disk in FIG. 5B will by no means be transferred to the user region of the recordable disk. In other words, information in the lead-in region of the optical disk of the third embodiment can never be copied to another recordable disk.

By scrambling or encrypting the information in the user region in the optical disk of the third embodiment and recording the cancel key in the lead-in region using the depth direction as described above, the cancel key recorded at the lead-in region will never be copied even if the information in the user region is copied into the another recordable disk.

Therefore, copying information in the recordable disk by the third embodiment is inhibited.

It is to be noted that information unique to the disk such as disk identification (ID) information other than the cancel key may be similarly recorded in the depth direction of the lead-in region. By such recording, undesirable copying of these information to another recordable disk can be inhibited completely. In other words, illegal copying of a disk that includes copyrighted contents can be prevented.

The above-described embodiment is directed to a transparent substrate having a thickness of 0.6 mm and a refractive index of 1.5 using a light beam having a wavelength of 650 nm and an optical system having an NA of 0.6. However, it is apparent that the above-described effect is not limited to the type of the used optical system, substrate or the like. Furthermore, the values of the pit depths are not limited to those shown in the above embodiment. According to the principle of the present invention, it is clear that depths are to be selected so that the polarity of the TPP signal differs for respective pits. Since a recordable region (user region) of the above-described recordable disk is absent of a recording dimension in the depth direction, copying information from an optical disk having a region recorded with information in the depth direction according to the above-described embodiment to a recordable disk can be inhibited. It is also apparent that the specific method therefor is not limited to that described above.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording medium recorded with information on a substrate, comprising:
    a first region having first information recorded at least in a depth direction of a plane direction and a depth direction of a said substrate; and
    a second region having second information recorded in the plane direction of said substrate;
    wherein said first information is recorded in said first region at least in said depth direction by at least a depth of a pit of the presence/absence, the length, the width, the position and the depth of the pit formed on said substrate, and said second information is recorded in said second region in said plane direction by at least one of the presence/absence, the length, the width, and the position of a pit formed on said substrate; and
    wherein said first region has said first information recorded in said depth direction by said pits having at least two different depths.

2. The optical recording medium according to claim 1, wherein a tangential push-pull signal differing in polarity according to the depth of a pit is obtained from said pits having at least two different depths when reproducing said first information from said first region.

3. The optical recording medium according to claim 1, wherein said two different depths of said pits are set so as to satisfy:

$$\lambda/8n < D1 < \lambda/4n \text{ and } \lambda/4n < D2 < 3\lambda/8n$$

where D1 and D2 are the respective two different depths, $\lambda$ is a wavelength of light used in reproducing the first information, and n is the refractive index of the substrate.

4. The optical recording medium according to claim 1, wherein said first information recorded in said first region includes additional information required for reproduction of said optical recording medium.

5. The optical recording medium according to claim 4, wherein said additional information includes information inhibited from being copied into another recording medium.

6. The optical recording medium according to claim 4, wherein said second information recorded in said second region includes main information.

7. The optical recording medium according to claim 6, wherein said additional information includes information required for reproduction of said main information.

8. The optical recording medium according to claim 7, wherein said additional information includes key information to cancel scrambling or encryption of said main information.

9. The optical recording medium according to claim 4, wherein said additional information includes information unique to said optical recording medium itself.

10. The optical recording medium according to claim 9, wherein said additional information includes information identifying said optical recording medium.

11. The optical recording medium according to claim 1, wherein the presence of pits of different depths itself comprises information identifying said optical medium.

* * * * *